April 2, 1968  R. H. STEIN  3,376,071
FLOOR STRIPPING MACHINE

Filed Dec. 7, 1965  2 Sheets-Sheet 1

INVENTOR.
ROY H. STEIN
BY
Anderson, Spangler & Wymore
ATTORNEYS

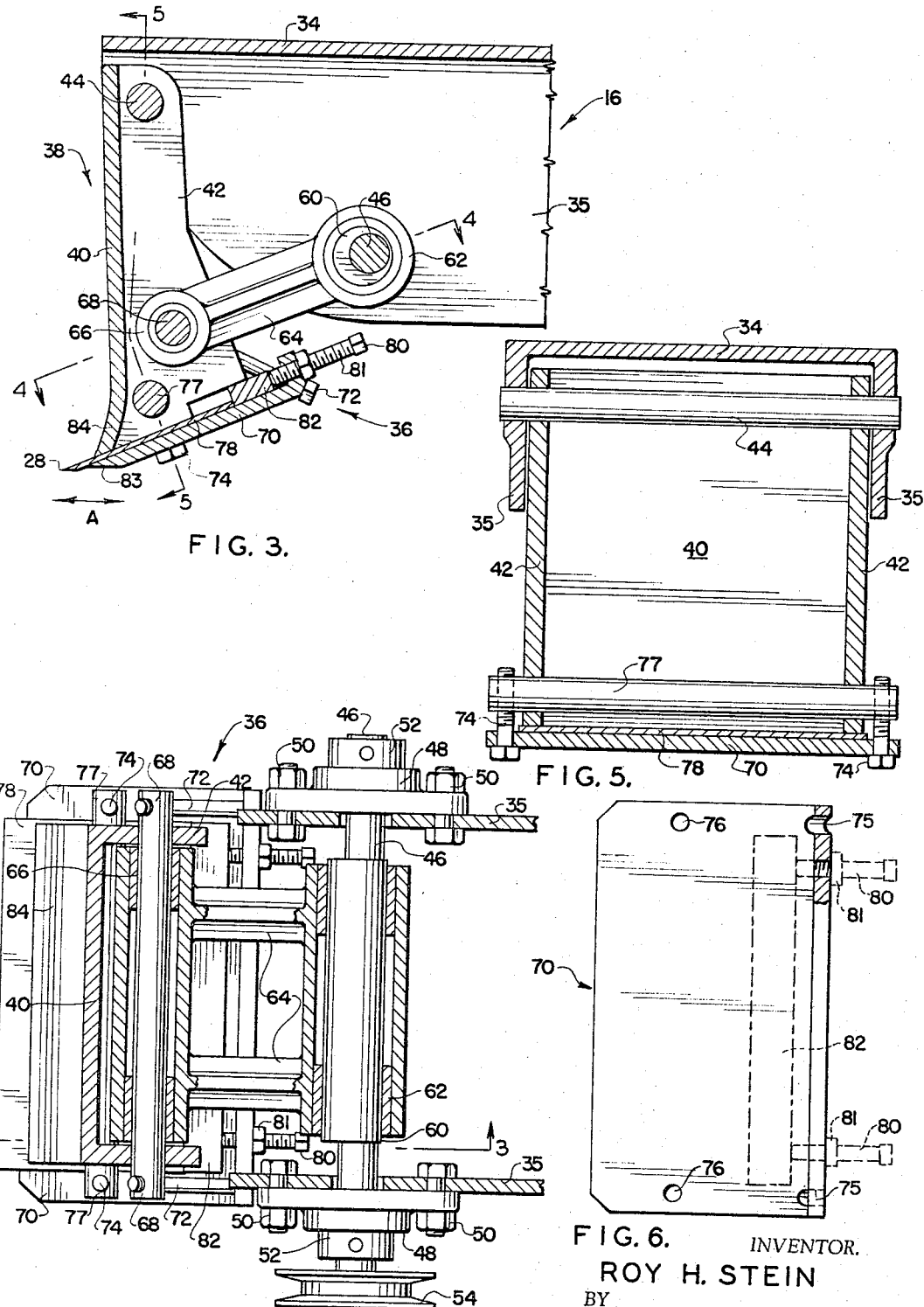

United States Patent Office 3,376,071
Patented Apr. 2, 1968

3,376,071
FLOOR STRIPPING MACHINE
Roy H. Stein, 3920 Zephyr, Wheat Ridge, Colo. 80033
Filed Dec. 7, 1965, Ser. No. 512,600
6 Claims. (Cl. 299—37)

ABSTRACT OF THE DISCLOSURE

The present power-operated floor stripping machine includes a cutting head and blade pivotally mounted on a mobile frame. An eccentric cam is mounted on a first shaft journaled in said frame and a power means is connected to the said first shaft to impart rotary movement thereto. A rod connects the cam and a second shaft rotatably mounted on said cutting head, thus effecting a reciprocating stripping motion of the cutting head and the cutting blade positioned therein whenever the power means rotates the first shaft.

---

The invention is embodied in a portable wheeled machine powered by an electric motor and the like. The machine is easily maneuvered by an operator by means of an extending handle bar and a pair of rubber ground-supporting wheels. A cutting blade is mounted at the forward end of the machine and moves back and forth in a rapid reciprocating motion while in contact with the surface of the floor. As the machine is moved along the floor the movement of the cutting blade strips off the immediate layer of floor surfacing by providing a fast moving chipping action which separates and breaks up the top layer.

When a commercial office building is remodeled it is usually necessary to replace the old flooring. If the flooring is linoleum, asphalt tile or any similar substance which is held in place by means of an adhesive cement removal by usual methods becomes a difficult problem. If the cement has substantially retained its adhesion with the subfloor it is difficult to remove the old flooring easily and without damaging the subfloor. Prior to the use of applicant's machine, old flooring was very laboriously removed by various hand methods. The common method employed was a hand scraper formed with a narrow scraping blade at the end of a heavy crowbar. This method was very slow and the narrow blade would inherently gouge the subfloor. Such hand methods have proven to be unsatisfactory for reasons of inefficiency, considerable subfloor damage and time involved. Aside from the fact that the machine of the instant invention performs the job in a fraction of the time involved in a hand-stripping operation, the surface of the subfloor after the flooring has been stripped is substantially smooth and is ready for a new floor application without a separate sanding or smoothing operation.

It is, therefore, the principal object of the present invention to provide a novel and improved floor stripping machine.

A second objective is to provide a readily portable power-operated floor stripping machine in place of a hand operation which strips a floor in a fraction of the time involved in the hand operation.

Another object of the present invention is to provide a power operated floor stripping machine which leaves the subfloor in a sufficiently smooth condition to immediately lay a new flooring.

Still another object of the instant invention is to provide a power-operated floor stripping machine which is exceedingly simple in construction and has very few parts.

Another object of the invention is to provide a floor stripping machine compact in size and is easily handled and maneuvered in limited spaces.

Further objects are to provide a stripping machine that is rugged, handy to use without specific skills, safe to operate, trouble-free and decorative in appearance.

Other objects will be in part apparent and in part pointed out specifically hereinafter in connection with the description of the drawings that follow and in which:

FIGURE 3 is an enlarged fragmentary sectional view taken along line 3—3 of FIGURE 4;

FIGURE 4 is an enlarged fragmentary sectional view taken along line 4—4 of FIGURE 3;

FIGURE 5 is a fragmentary sectional view taken along line 5—5 of FIGURE 3; and

FIGURE 6 is a top plan view of the blade retaining shoe with the blade stop and adjusting set screws shown in dotted line.

Figure 1:
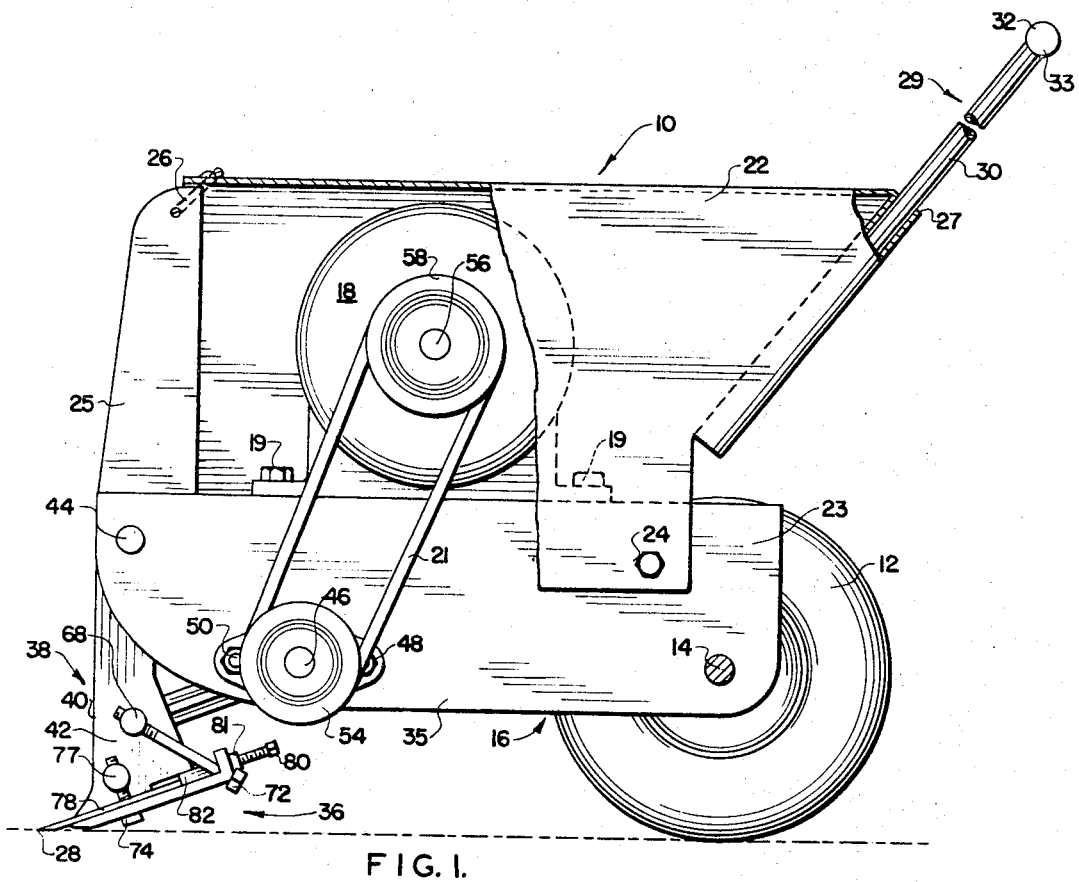
FIGURE 1 is a side elevational view of the floor stripping machine with a portion of the covering shroud broken away to reveal the power source and its drive means.
Figure 2:
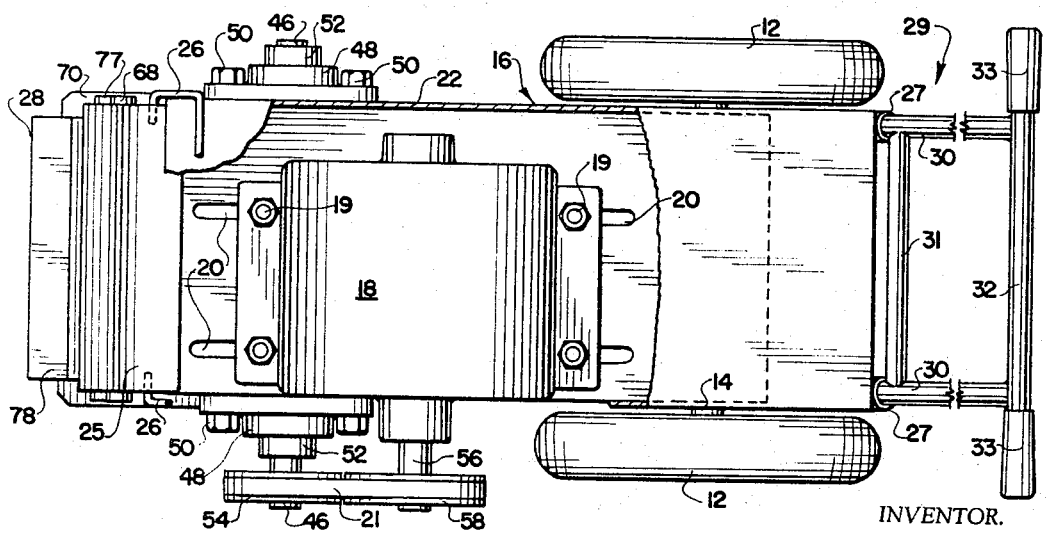
FIGURE 2 is a plan view of the machine with a portion of the covering shroud broken away as in FIGURE 1; the handle is shown with a portion broken away to conserve space.

Referring now to the drawings for a detailed description of the present invention, and initially, to FIGURES 1 and 2, inclusive, for this purpose, it will be seen that the stripping machine has been designated in its entirety by reference numeral 10. Mounted on the machine 10 are a pair of rubber tires 12 which permit the machine 10 to be easily transported and maneuvered. The wheels 12 are carried by an axle 14 which in turn passes through the rear portions of the base frame 16. Mounted atop the frame 16 is an electrical motor 18. Although an electrical motor is shown in the drawings, the machine 10 may also be powered by an internal combustion engine. The motor 18 is held in place by four mounting bolts 19 which pass through slots 20 in the frame 16. When the bolts 19 are loosened the motor can be moved forward or backward on the frame 16 by reason of the slots 20 to adjust the tension in the drive belt 21. Covering the motor 18 and attached to the frame 16 is a cover shroud 22. The shroud 22 slides over the side walls 23 of the frame and is held in place by bolts 24 as can be seen in FIGURE 1. Positioned on the front of the frame 16 is a nose weight 25. The weight is held in place by means of a releasable wire clip 26 which fastens the forward edge of the shroud 22 with the weight 25. The weight provides the necessary weight on the cutting edge 28 which will later be described.

The rear edge of the sheet metal shroud 22 is rolled into a circular shape 27 adapted to accommodate the end portions of the handle bar 29. The handle bar 29 comprises a pair of elongated tubular members 30 which are attached at their lower ends to the shroud 22, and at their upper ends are joined by tubular cross members 31 and 32. Positioned on the outer ends of the cross member 32 are a pair of hand grips 33 which are used to handle and maneuver the machine 10.

FIGURES 3 through 6 show the cutter head subassembly 36 in detail and it is to these figures that reference will now be made. The frame 16 previously mentioned is substantially U-shaped with a horizontal web portion 34 and a pair of vertical flanges 35 as can best be seen in FIGURE 5. At the forward end of the frame 16 positioned between the webs 35 is the cutting head 38. The head 38 is formed with a web 40 and a pair of flanges 42. The cutting head is pivotally mounted at the upper end to the frame 16 by a pin 44 which passes through both pairs of flanges 35 and 42. Passing through the pair of flanges 35 and journalled thereto is a rotatably mounted cam shaft 46 which is shown in FIGURE 4. The cam shaft 46 is journalled at its outer ends in a pair of roller bearings 48 which are in turn bolted to the frame flanges 35 by means of bolts 50. Retaining the cam shaft in the bearings 48 are a pair of locking sleeves 52 which are mounted on the cam shaft 46 immediately outward of the bearings 48. Keyed to one end of the cam shaft 46 is a sheave 54 adapted to carry a V-belt. Mounted on the shaft 56 of the motor 18 is a similar sheave 58 which lies in the same plane of rotation as sheave 54. The two sheaves 54 and 58 are connected by means of a rubber V-belt 21. The tension in the V-belt 21 may be adjusted as previously discussed.

Again referring to FIGURE 4 it will be seen that the camming surface 60 is centrally positioned on the cam shaft 46. Rotatably journalled to the camming surface 60 is a bearing 62 attached to a connecting rod 64. At the opposite end of the connecting rod 64 is a bearing 66 which is rotatably journalled to a connecting rod shaft 68. The connecting rod shaft 68 is in turn mounted on the cutting head 38. When the cam shaft 46 is rotated the connecting arm 64 causes the cutting head 38 to move back and forth pivoting about its pin 44 in a reciprocating motion as shown by the arrows A in FIGURE 3.

At the lower extremities of the cutting head 38 the flanges 42 become wider to accommodate the cutting blade shoe 70. The shoe 70 is adjustably held against the cutting head by two pairs of bolts 72 and 74. The bolts 72 pass through openings 75 in the rear of the blade shoe 70 and are threaded into the ends of the connecting rod shaft 58. The bolts 74 pass through openings 76 and are threaded into the ends of shaft 77. The purpose of the blade shoe 70 is to rigidly hold the cutting blade 78 in its cutting position. Located on the back edge of the blade shoe 70 are a pair of adjusting bolts 80 and locking nuts 81 which allow for adjustment of the position of the blade stop 82 which in turn adjusts the amount of blade edge exposure. The front edge 83 of the blade shoe 70 is tapered to provide a maximum amount of rigidity to the cutting blade and yet permit a shallow angle of slope between the cutting blade 78 and the flooring surface being stripped.

The operation of the stripping machine 10 varies with the type of floor being removed. The steeper the angle of the blade 78 with the floor the deeper the blade will dig. The angle can be varied by lifting the wheels 12 off the floor. The angle can also be varied by extending the blade 78 further past the edge of the shoe 70. When removing a plywood or particle board floor an extra long blade which extends an additional four inches or more past the edge of the shoe 70 has proven very useful. The longer the blade 78 is extended out of the shoe the less the angle between the cutting blade and floor. The amount of weight applied to the cutting edge 28 is also variable depending upon the flooring being removed. The weight can be varied by the amount of pressure applied by the hands to the handle bar 29. Generally, the machine best operates when the handle bar 29 is lifted up until the wheels are one-half inch off the floor. When an exceptionally tough flooring is being removed, a blade with teeth formed on the cutting edge has been found to be very effective.

From the foregoing description it will be seen that simple and efficient means are herein provided for accomplishing the objects of the invention, but while the elements shown and described are well adapted to serve the purpose for which they are intended, it is to be understood that the invention is not limited to the precise structure set forth, but includes within its purview such changes therein which may well occur to those skilled in the art within the broad teaching thereof and the scope of protection afforded hereby shall be limited only insofar as said limitations are expressly set forth in the appended claims.

What is claimed is:
1. A power-operated floor stripping machine adapted to strip off various types of old flooring which comprises: a supporting frame, power means mounted on said frame, a pair of wheels rotatably mounted to the rear portion of said frame, a handle bar for guiding and maneuvering the machine attached at the rear portion of said frame and extending rearwardly therefrom, a cutting head pivotally mounted on said frame in depending relation at a point forward of said wheels, a cutting blade carried by said cutting head having an exposed cutting edge at its lower extremity, a first shaft means journalled for rotation in said frame, a cam surface eccentrically mounted on said a first shaft means, drive means connecting the power means and the said first shaft means to rotatably drive said first shaft means, a second shaft means rotatably mounted on said cutting head, a connecting rod which the said cam surface is rotatably journalled in one end thereof and the opposite end thereof is rotatably mounted on said second shaft means whereby rotation of the first shaft means causes the cutting head and thus the free edge of the cutting blade to move in a reciprocating stripping motion.

2. The power-operated floor stripping machine as set forth in claim 1 in which: the cutting head includes a cutting blade shoe which is mounted at the lower end of the cutting head and is adapted to holding the cutting blade in sandwiched relation therebetween.

3. The power-operated floor stripping machine as set forth in claim 2 in which: the shoe further includes an upstanding leg on its rear edge, adjustment means positioned on said leg which bears against the rear edge of the cutting blade and regulates the distance the cutting blade extends past the shoe.

4. The power-operated floor stripping machine as set forth in claim 1 which further includes: a nose weight which is attached to the forward edge of the frame, a shroud means which is attached to the upper portions of the frame and encloses the power means and the nose weight.

5. The power-operated floor stripping machine as set forth in claim 2 which further includes: a first fastening means located adjacent the forward edge of the shoe which adjustably secures the shoe against the head, a second adjustable fastening means interconnects the rear portion of the shoe and head in fastening relation which second fastening means applies a forwardly and upwardly force securing the shoe against rearward movement relative to the head.

6. The power-operated floor stripping machine as set forth in claim 1 which further includes a series of slots in the frame, the slots provide openings for the mounting bolts which fasten the motor to the frame, whereby when the bolts are released the motor may be moved the distance of the slots to provide a tension adjustment for said drive means.

References Cited
UNITED STATES PATENTS

| | | | |
|---|---|---|---|
| 744,763 | 11/1903 | Karns | 175—384 X |
| 2,005,630 | 6/1935 | Overell | 299—37 |
| 3,074,090 | 1/1963 | Thompson | 299—37 X |
| 3,168,835 | 2/1965 | Nuss | 74—242.13 |

ERNEST R. PURSER, *Primary Examiner.*